US012803174B2

(12) United States Patent
Chang et al.

(10) Patent No.: US 12,803,174 B2
(45) Date of Patent: Nov. 17, 2026

(54) ANTENNA

(71) Applicant: MEDIATEK INC., Hsinchu City (TW)

(72) Inventors: Hsuan-Jui Chang, Hsinchu City (TW); Shih-Huang Yeh, Hsinchu City (TW); Wun-Jian Lin, Hsinchu City (TW); Chih-Hsiang Liu, Hsinchu City (TW)

(73) Assignee: MEDIATEK INC., Hsinchu City (TW)

(*) Notice: Subject to any disclaimer, the term of this patent is extended or adjusted under 35 U.S.C. 154(b) by 81 days.

(21) Appl. No.: 18/935,630

(22) Filed: Nov. 3, 2024

(65) Prior Publication Data

US 2025/0167456 A1 May 22, 2025

Related U.S. Application Data

(60) Provisional application No. 63/601,270, filed on Nov. 21, 2023.

(51) Int. Cl.
*H01Q 13/18* (2006.01)

(52) U.S. Cl.
CPC .................................. *H01Q 13/18* (2013.01)

(58) Field of Classification Search
CPC ............................... H01Q 1/243; H01Q 13/18
See application file for complete search history.

(56) References Cited

U.S. PATENT DOCUMENTS

2013/0127674 A1* 5/2013 Korva ...................... H01Q 9/42 343/702
2022/0021122 A1* 1/2022 Miller .................... H01Q 13/18

* cited by examiner

*Primary Examiner* — Daniel Munoz
(74) *Attorney, Agent, or Firm* — Winston Hsu

(57) ABSTRACT

An antenna can include a first wall, a second wall, a third wall, a feed element, and a conductive path. The first wall can have a front side, an upper side, a lower side, a rear side and a first slot. The first slot can have an open end at the front side of the first wall, and a closed end. The second wall can have a front side, an upper side, a lower side, a rear side, and a second slot. The second slot can have an open end at the front side of the second wall, and a closed end. The third wall can be connected to the upper side of the first wall and the upper side of the second wall. The conductive path can have a first terminal coupled to the feed element, and a second terminal coupled to a feed point.

23 Claims, 11 Drawing Sheets

ANTENNA

CROSS REFERENCE TO RELATED APPLICATIONS

This application claims the benefit of U.S. Provisional Application No. 63/601,270, filed on Nov. 21, 2023. The content of the application is incorporated herein by reference.

BACKGROUND

With the growing prevalence of wireless communication applications, the demand for antennas has correspondingly increased. In portable devices that support wireless communication, it is crucial to integrate antennas within the device. Presently, antennas that facilitate signal transmission and reception in the broadside radiation direction are available. However, there is a need for more effective solutions to enhance the radiation coverage, such as enabling communication in the endfire radiation direction. Furthermore, for antennas required to operate across multiple frequency bands, there is a continuous demand for more optimal solutions.

SUMMARY

An embodiment provides an antenna used to access a wireless signal. The antenna can include a first wall, a second wall, a third wall, a feed element, and a conductive path.

The first wall can have a front side, an upper side, a lower side, a rear side and a first slot. The first slot can have an open end at the front side of the first wall, and a closed end.

The second wall can have a front side, an upper side, a lower side, a rear side, and a second slot. The second slot can have an open end at the front side of the second wall, and a closed end.

The third wall can be connected to the upper side of the first wall and the upper side of the second wall. The feed element can be used to access a first signal corresponding to the wireless signal. The conductive path can be used to transmit the first signal, and have a first terminal coupled to the feed element, and a second terminal coupled to a feed point.

These and other objectives of the present invention will no doubt become obvious to those of ordinary skill in the art after reading the following detailed description of the preferred embodiment that is illustrated in the various figures and drawings.

DETAILED DESCRIPTION

In this document, unless otherwise specified, when referring to the distance between two components, it refers to the distance between the centerlines of the two components. For example, when referring to the distance between a first wall and a second wall, it refers to the distance between the centerline of the first wall and the centerline of the second wall. The centerline of a wall mentioned here refers to the centerline between a first face and a second face of the wall, where the distance between the first face and the second face is the thickness of the wall.

Regarding the radiation directions of antennas, there are two main types: broadside radiation direction and endfire radiation direction. The broadside radiation direction can be used to cover a wide area in a plane perpendicular to the antenna array.

The endfire direction and the broadside direction can be orthogonal. Therefore, in an antenna array, when both radiation modes coexist, the antenna's radiation coverage is increased.

Figure 1:
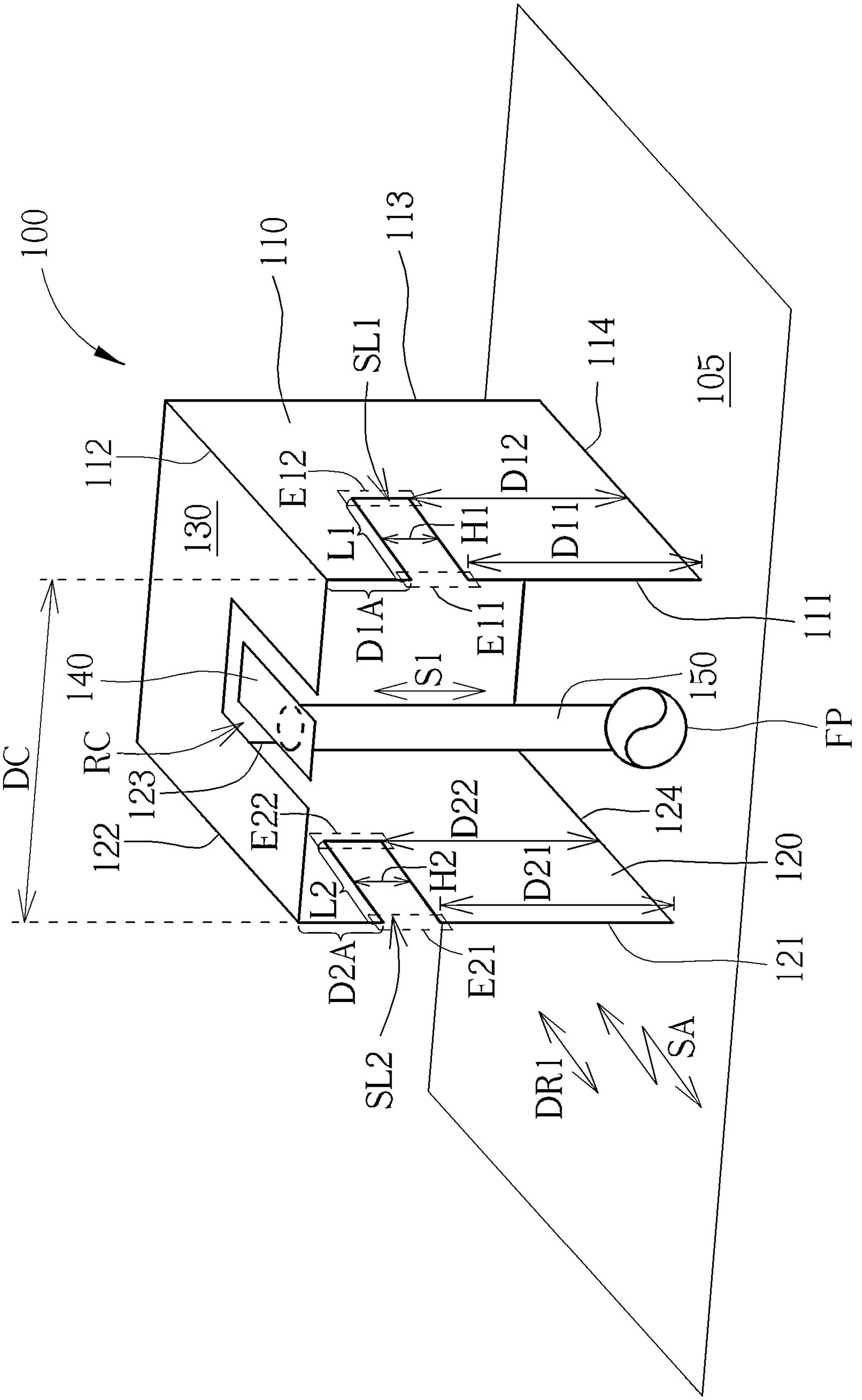
FIG. 1 to FIG. 4 illustrates antennas according to different embodiments.

FIG. 1 illustrates an antenna 100 according to an embodiment. FIG. 1 can be a perspective view of the antenna 100, FIG. 1 is used to illustrate the structure of the antenna 100, and the size proportions of the components of the antenna 100 are not limited to those shown in FIG. 1 and can be adjusted as needed. The antenna 100 can be used to access wireless signal SA and include a first wall 110, a second wall 120, a third wall 130, a feed element 140 and a conductive path 150.

The first wall 110 can have a front side 111, an upper side 112, a rear side 113, a lower side 114, and a first slot SL1. The first slot SL1 can have an open end E11 at the front side 111 of the first wall 110, and a closed end E12.

The second wall 120 can have a front side 121, an upper side 122, a rear side 123, a lower side 124, and a second slot SL2. The second slot SL2 can have an open end E21 at the front side 121 of the second wall 120, and a closed end E22.

The third wall 130 can be connected to the upper side 112 of the first wall 110 and the upper side 122 of the second wall 120.

The feed element 140 can be used to access a first signal S1 corresponding to the wireless signal SA. The conductive path 150 can be used to transmit the first signal S1 and have a first terminal and a second terminal, the first terminal can be coupled to the feed element 140, and the second terminal can be coupled to a feed point FP. The feed point FP can be coupled to a circuit, such as an integrated-circuit (IC) or a signal processing circuit, to process the signals and data transmitted and received by the antenna 100. The antenna 100 can be formed on a plane 105. The plane 105 can be a metal plane with a reference voltage level, such as a ground voltage level.

The third wall 130 can have a recess RC, and the feed element 140 can be formed to be in the recess RC and substantially coplanar with the third wall 130. For example, the feed element 140 and the third wall 130 can be formed using the same metal layer of the printed circuit board (PCB).

The first wall 110 can be substantially parallel to the second wall 120. The first wall 110 can be substantially perpendicular to the third wall 130, and the second wall 120 can be substantially perpendicular to the third wall 130. The first wall 110, the second wall 120, the third wall 130, the feed element 140 and the conductive path 150 can be formed of a conductive material, such as metal.

The first slot SL1 and the second slot SL2 can be formed to be symmetrical and aligned. The first slot SL1 can be substantially parallel to the second slot SL2. A distance D11 between the open end E11 of the first slot SL1 and the lower side 114 of the first wall 110 can be substantially equal to a distance D21 between the open end E21 of the second slot SL2 and the lower side 124 of the second wall 120. A distance D12 between the closed end E12 of the first slot SL1 and the lower side 114 of the first wall 110 can be substantially equal to a distance D22 between the closed end E22 of the second slot SL2 and the lower side 124 of the second wall 120.

Each of the first slot SL1 and the second slot SL2 can further have an upper side and a lower side, a distance H1 between the upper side and the lower side of the first slot SL1 can be substantially equal to a distance H2 between the upper side and the lower side of the second slot SL2.

The antenna 100 can transmit and receive signals along a direction DR1, where direction DR1 can be the endfire direction of the radiation of the antenna 100. Due to the presence of the first slot SL1 and the second slot SL2, the antenna 100 can excite resonance to transmit and receive signals in two frequency bands, hereinafter referred to as frequency band HB and frequency band HL, where the frequency band HB can be higher than the frequency band HL.

As shown in FIG. 1, the upper side of the first slot SL1 can have a length L1, the distance between the open end E11 of the first slot SL1 and the upper side 112 of the first wall 110 can be DIA, the upper side of the second slot SL2 can have a length L2, the distance between the open end E21 of the second slot SL2 and the upper side 112 of the second wall 120 can be D2A, and the first wall 110 and the second wall 120 can be separated with a distance DC.

One half of the wavelength of the frequency band LB can be approximately equal to the sum of the length L1, the distance D1A, the distance DC, the distance D2A, and the length L2. If the wavelength of the frequency band LB is represented as $\lambda_{LB}$, it can be expressed as $0.5\times\lambda_{LB}\approx L1+D1A+DC+D2A+L2$.

One fourth of the wavelength of frequency band HB can be approximately equal to the sum of the length L1 and the length L2. If the wavelength of the frequency band HB is represented as $\lambda_{HB}$, it can be expressed as $0.25\times\lambda_{HB}\approx L1+L2$.

The above equations serve as examples. The actual operating frequency band of the antenna is related to the parts of the antenna that are excited. The excited parts of the antenna are not limited to the slots or edges between specific points of the antenna hardware. Therefore, the equations use the "approximately equal to" symbol (≈) instead of an equal sign. However, by adjusting the shape and size of the antenna, the operating frequency bands of the antenna can be adjusted.

Figure 2:
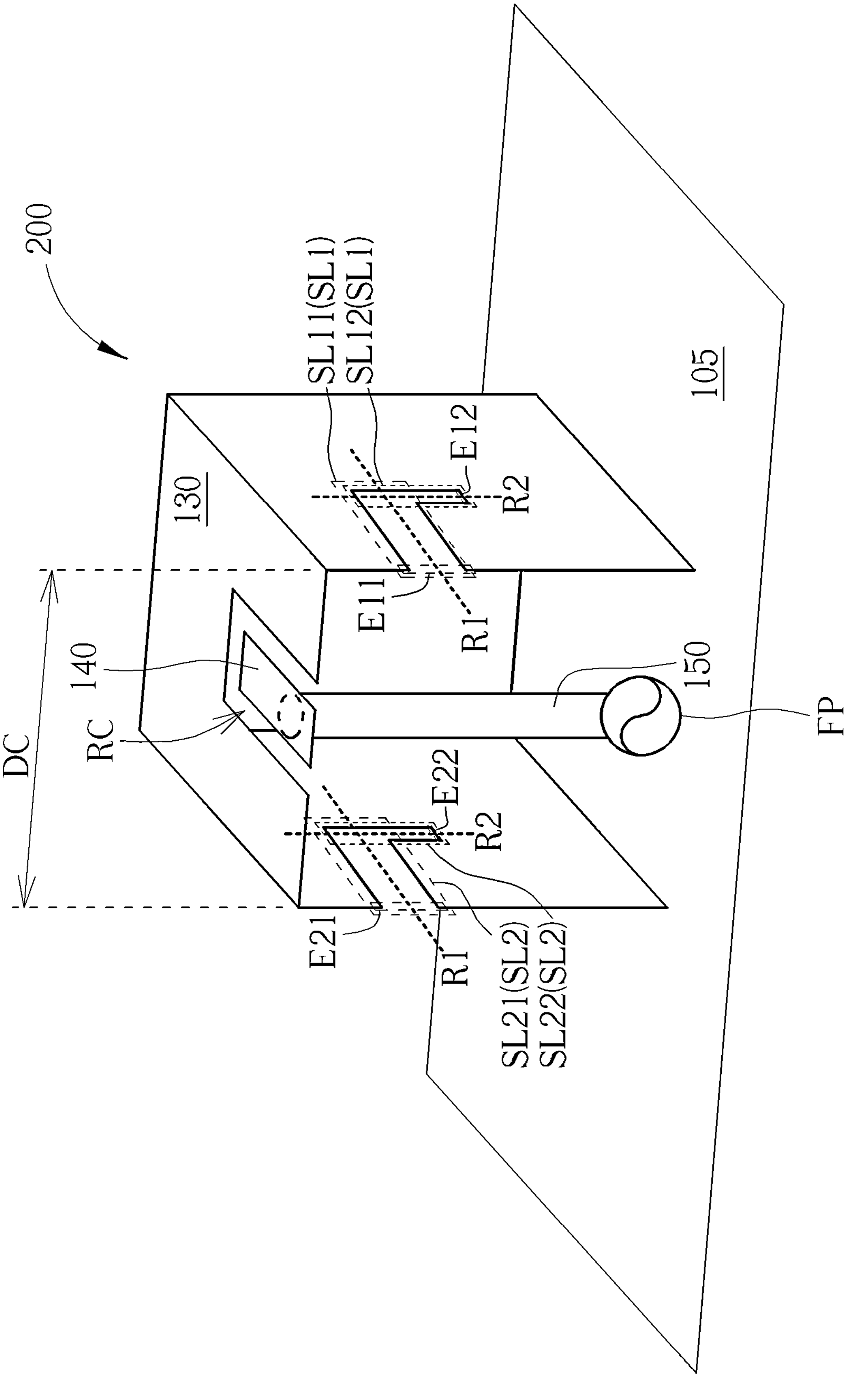

FIG. 2 illustrates an antenna 200 according to another embodiment. The similarities between FIG. 2 and FIG. 1 are not reiterated. FIG. 2 differs from FIG. 1 in that, in FIG. 2, each of the first slot SL1 and the second slot SL2 can have two parts to form a bent shape.

In FIG. 2, the first slot SL1 can have a first part SL11 and a second part SL12. The first part SL11 can be formed along a first reference line R1. The first part SL11 can have a first end connected to the open end E11 of the first slot SL1, and a second end. The second part SL12 can be formed along a second reference line R2 different from the first reference line R1. The second part SL12 can have a first end connected to the second end of the first part SL11 of the first slot SL1, and a second end connected to the closed end E12 of the first slot SL1.

Like the first slot SL1, the second slot SL2 can have a first part SL21 and a second part SL22. The first part SL21 can be formed along the first reference line R1. The first part SL21 can have a first end connected to the open end E21 of the second slot SL2, and a second end. The second part SL22 can be formed along the second reference line R2. The second part SL22 can have a first end connected to the second end of the first part SL21 of the second slot SL2, and a second end connected to the closed end E22 of the second slot SL2.

Figure 3:
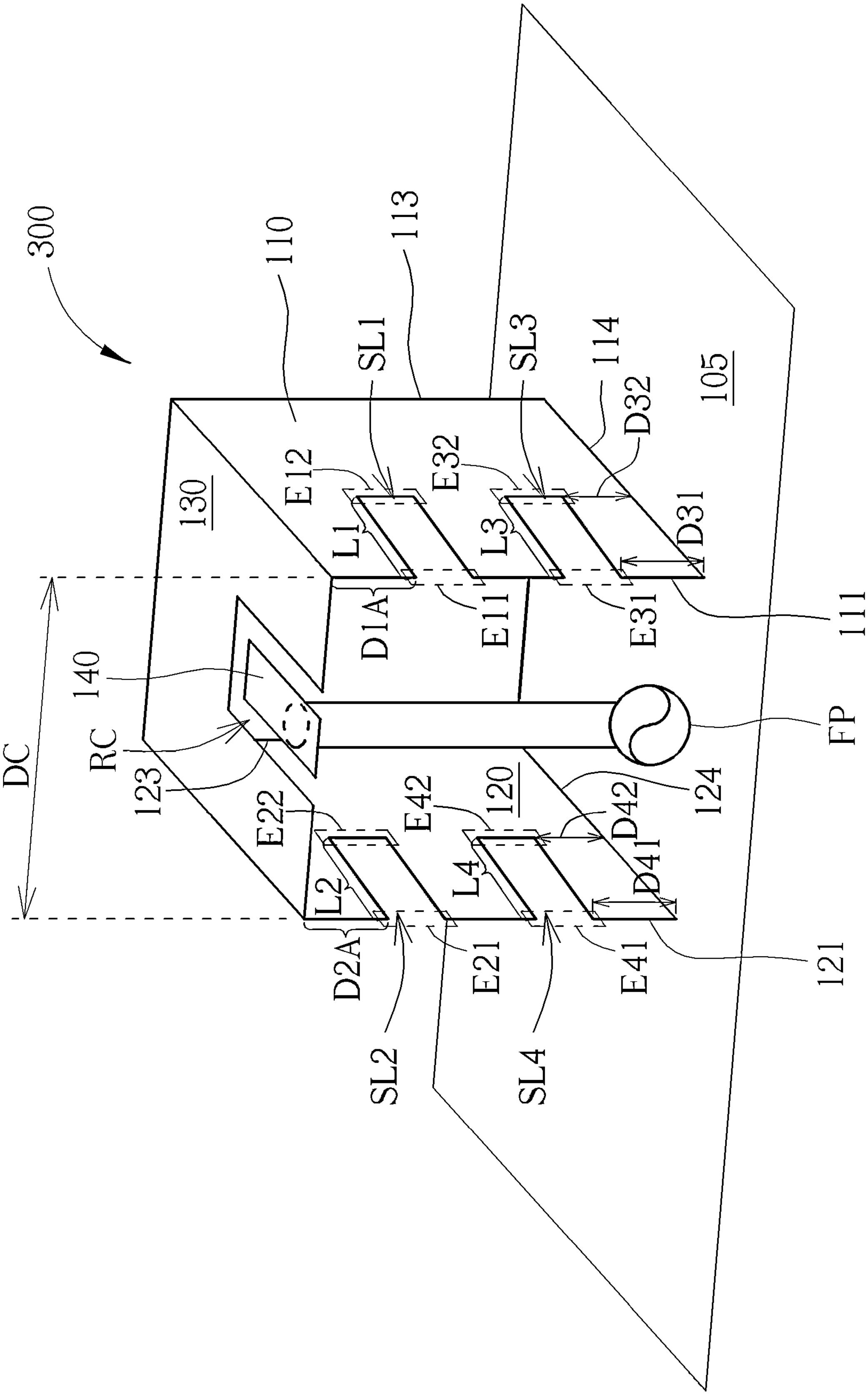

FIG. 3 illustrates an antenna 300 according to another embodiment. The similarities between FIG. 3 and FIG. 1 are not reiterated. To support more frequency bands, the antenna 300 can have more slots. In the antenna 300, the first wall 110 can further have a third slot SL3 formed below the first slot SL1. The third slot SL3 can have an open end E31 at the front side 111 of the first wall 110, and a closed end. The second wall 120 can further have a fourth slot SL4 formed below the second slot SL2. The fourth slot SL4 can have an open end E41 at the front side 121 of the second wall 120, and a closed end E42.

The first slot SL1 and the second slot SL2 can be excited to support the aforementioned frequency band HB. The first slot SL1 and the second slot SL2 can be excited to support another frequency band (expressed as HB2) higher than the frequency band HB.

The length between the open end E11 and the closed end E12 of the first slot SL1 can be greater than or equal to the length between the open end E31 and the closed end E32 of the third slot SL3. The length between the open end E21 and the closed end E22 of the second slot SL2 can be greater than or equal to the length between the open end E41 and the closed end E42 of the fourth slot SL4. Hence, in FIG. 3, the length L1 can be greater than or equal to the length L3 ($L1\geq L3$), and the length L2 can be greater than or equal to the length L4 ($L2\geq L4$).

The third slot SL3 and the fourth slot SL4 can be aligned. A distance D31 from the open end E31 of the third slot SL3 to the lower side 114 of the first wall 110 can be substantially equal to a distance D41 from the open end E41 of the fourth slot SL4 to the lower side 124 of the second wall 120. A distance D32 from the closed end E32 of the third slot SL3 to the lower side 114 of the first wall 110 can be substantially equal to a distance D42 from the closed end E42 of the fourth slot SL4 to the lower side 124 of the second wall 120.

If the slots have bent shapes as shown in FIG. 2, the total length of the first slot SL1 can be greater than or equal to the third slot SL3, and the total length of the second slot SL2 can be greater than or equal to the fourth slot SL4.

In FIG. 3, the first slot SL1, the second slot SL2, the third slot SL3, and the fourth slot SL4 can be substantially parallel to each other. The open ends of the first slot SL1, the second slot SL2, the third slot SL3, and the fourth slot SL4 can be lower than, higher than, or level with their respective closed ends.

Figure 4:
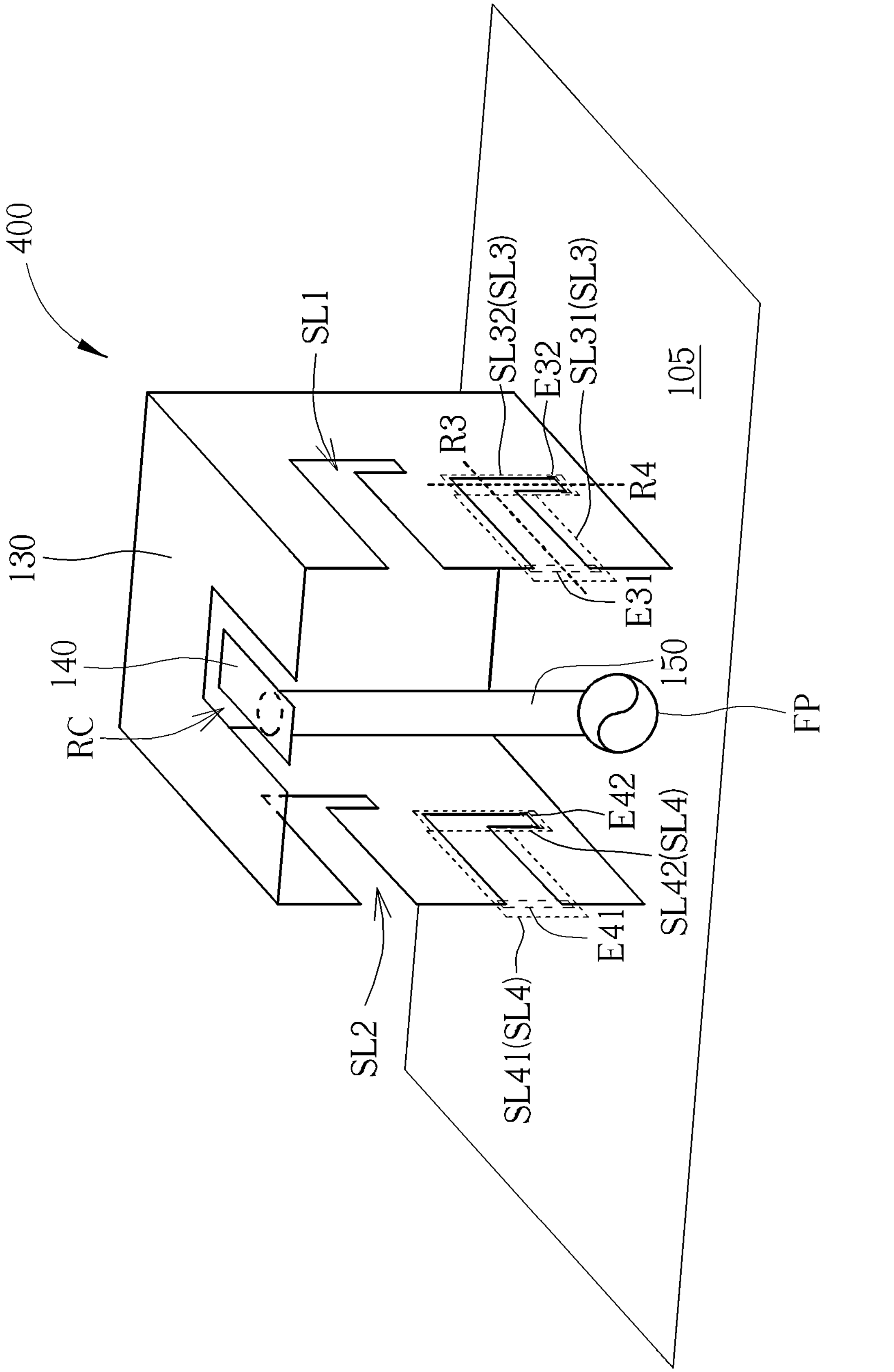

FIG. 4 illustrates an antenna 400 according to another embodiment. In FIG. 4, the first slot SL1 and the second slot SL2 can be similar to FIG. 2, having a bent shape, where each slot is formed by two parts. Similar to FIG. 3, in FIG. 4, the first slot SL1 and the third slot SL3 can be formed on the first wall 110, and the second slot SL2 and the fourth slot SL4 can be formed on the second wall 120.

The third slot SL3 can have a first part SL31 and a second part SL32. The first part SL31 can be formed along a third reference line R3. The first part SL31 can have a first end connected to the open end E31 of the third slot SL3, and a second end. The second part SL32 can be formed along a fourth reference line R4 different from the third reference line R3. The second part SL32 can have a first end connected to the second end of the first part SL31, and a second end connected to the closed end E32 of the third slot SL3.

The fourth slot SL4 can have a first part SL41 and a second part SL42. The first part SL41 can be formed along the third reference line R3. The first part SL41 can have a first end connected to the open end E41 of the fourth slot SL4, and a second end. The second part SL42 can be formed along the fourth reference line R4. The second part SL42 can have a first end connected to the second end of the first part SL41, and a second end connected to the closed end E42 of the fourth slot SL4.

Figure 5:
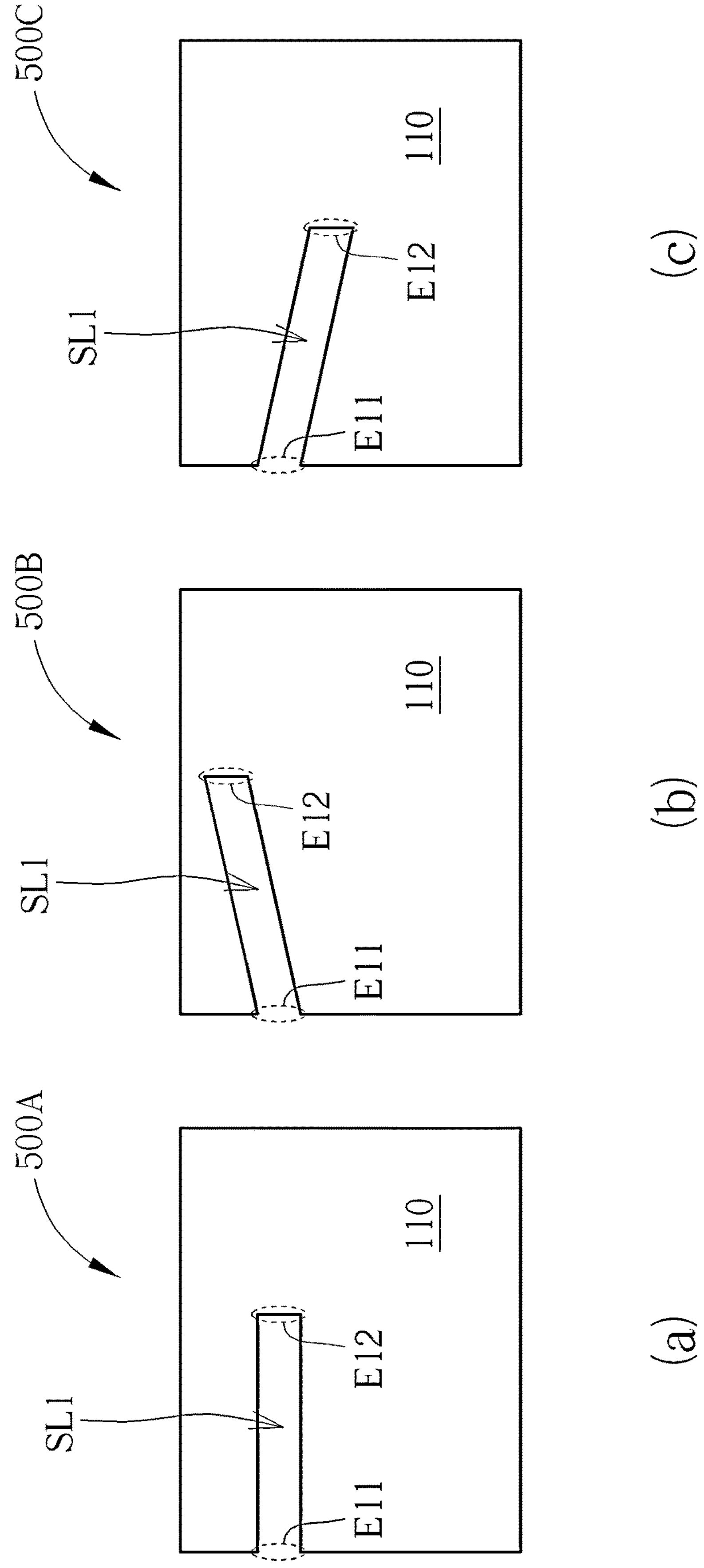
FIG. 5 to FIG. 8 are side views of antennas according to different embodiments.

FIG. 5 illustrates side views of antennas 500A, 500B and 500C according to different embodiments. In the antenna 500A, the open end E11 of the first slot SL1 can be level with the closed end E12 of the first slot SL1. In the antenna 500B, the open end E11 can be lower than the closed end E12. In the antenna 500C, the open end E11 can be higher than the closed end E12.

Figure 6:
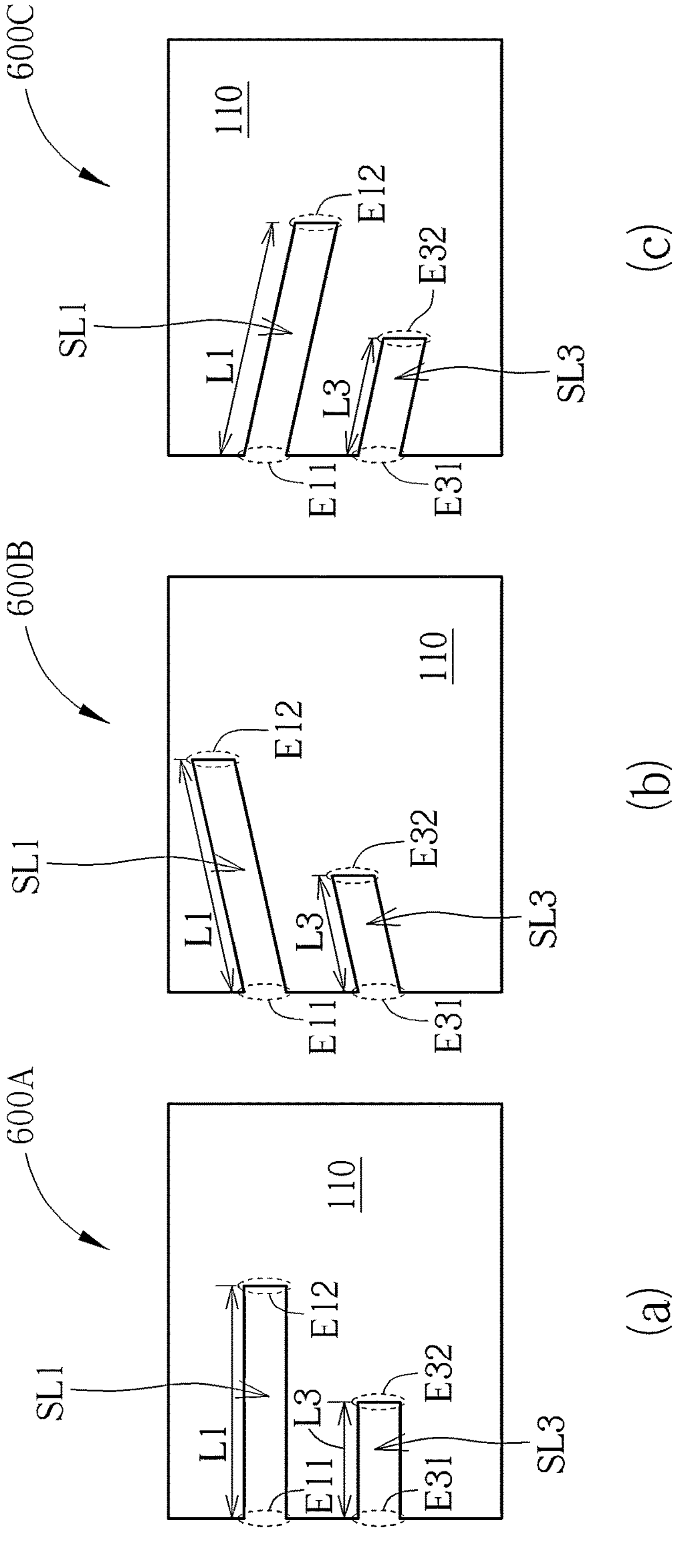

FIG. 6 illustrates side views of antennas 600A, 600B and 600C according to different embodiments. In FIG. 6, the first wall 110 can have two slots. In the antenna 600A, the open end E11 of the first slot SL1 can be level with the closed end E12 of the first slot SL1, and the open end E31 of the third slot SL3 can be level with the closed end E32 of the third slot SL3. In the antenna 600B, the open end E11 of the first slot SL1 can be lower than the closed end E12 of the first slot SL1, and the open end E31 of the third slot SL3 can be lower than the closed end E32 of the third slot SL3. In the antenna 600C, the open end E11 of the first slot SL1 can be higher than the closed end E12 of the first slot SL1, and the open end E31 of the third slot SL3 can be higher than the closed end E32 of the third slot SL3. As shown in FIG. 6, the length L1 can be greater than or equal to the length L3.

Figure 7:
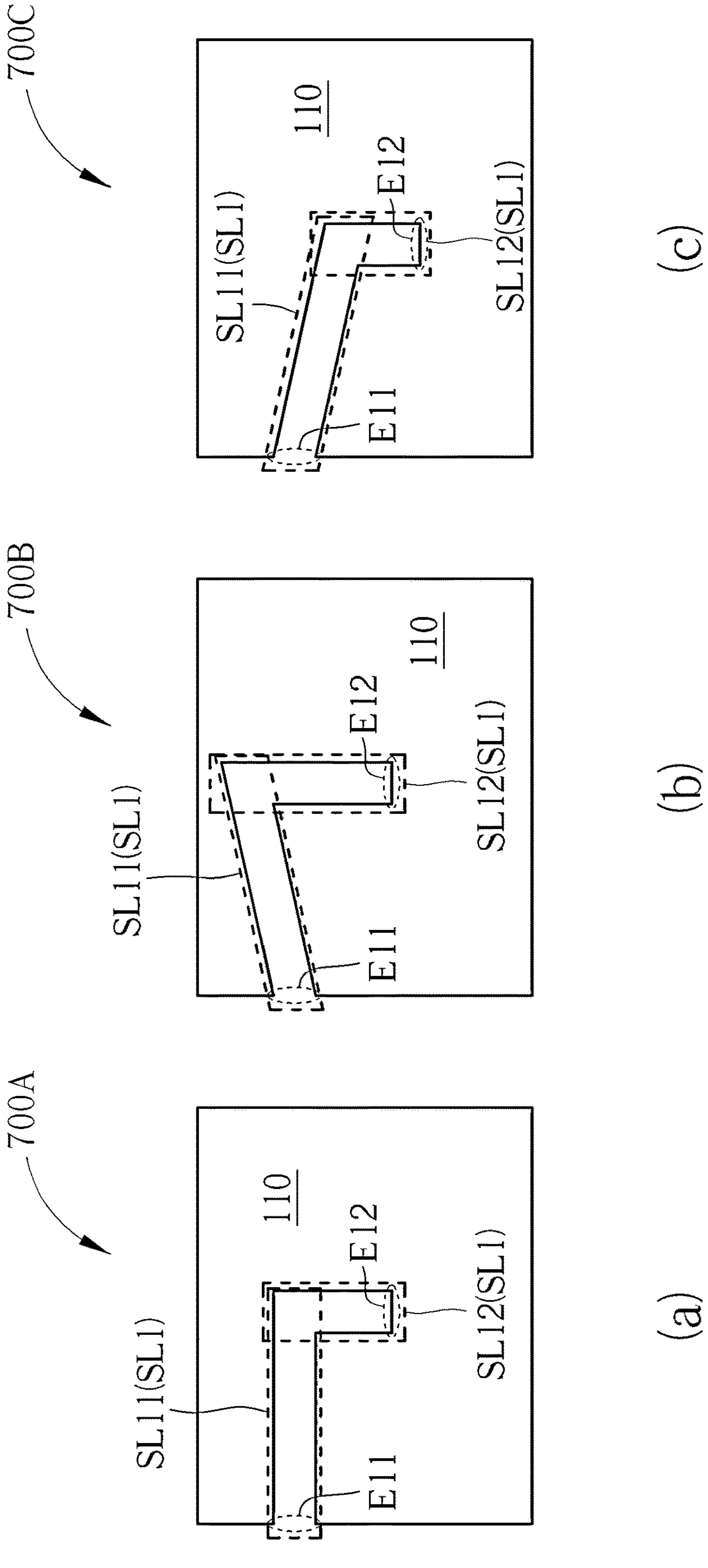

FIG. 7 illustrates side views of antennas 700A, 700B and 700C according to different embodiments. Each of the antennas 700A, 700B, and 700C can feature a first slot SL1 with a bent shape. In the antenna 700A, the open end E11 of the first slot SL1 can be level with the connection portion of the first part SL11 and the second part SL12 of the first slot SL1. In the antenna 700B, the open end E11 of the first slot SL1 can be lower than the connection portion of the first part SL11 and the second part SL12 of the first slot SL1. In the antenna 700C, the open end E11 of the first slot SL1 can be higher than the connection portion of the first part SL11 and the second part SL12 of the first slot SL1.

In FIG. 7, the second part SL12 of the first slot SL1 can be formed to be approximately perpendicular to the lower side 114 of the first wall 110, but embodiments are not limited thereto, the second part SL12 can also be formed in other directions to adjust the antenna performance.

Figure 8:
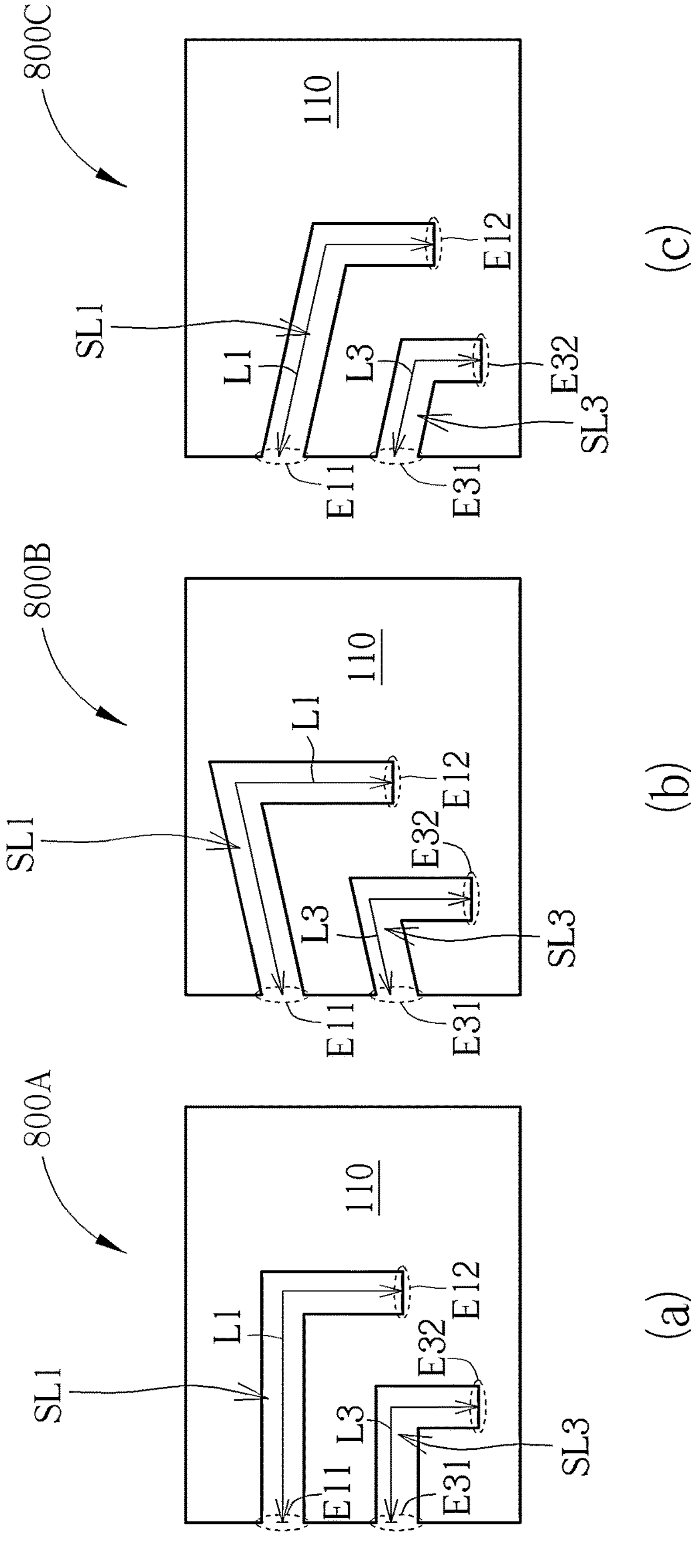

FIG. 8 illustrates side views of antennas 800A, 800B and 800C according to different embodiments. In FIG. 8, the first slot SL1 can be similar to that shown in FIG. 6, and the similarities are not reiterated. In each of the antennas 800A, 800B and 800C, the third slot SL3 can have a bent shape and be formed to be aligned with the first slot SL1. In each of the antennas 800A, 800B and 800C, the total length L1 of the first slot SL1 can be greater than or equal to the total length L3 of the third slot SL3.

Figure 9:
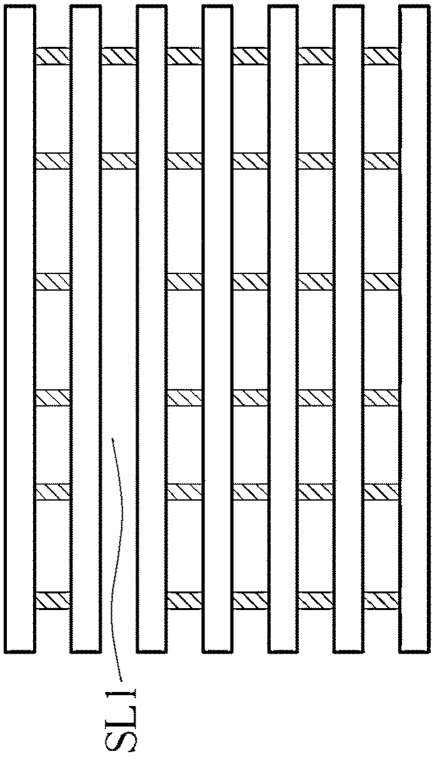
FIG. 9 to FIG. 12 illustrates cross-sectional views of antennas formed in circuit boards according to different embodiments.
Figure 10:
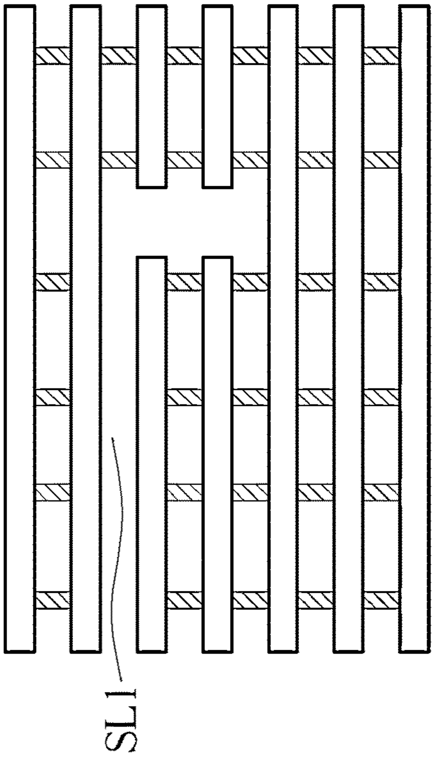
Figure 11:
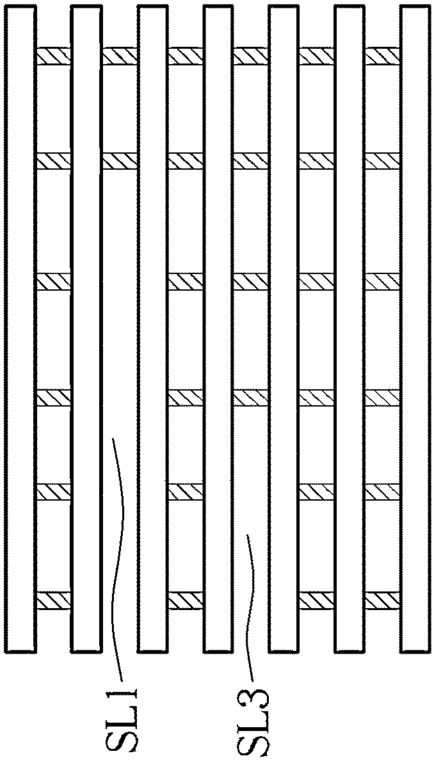

FIG. 9 to FIG. 12 illustrates cross-sectional views of antennas formed in circuit boards according to different embodiments. In FIG. 9 to FIG. 11, horizontal layers can be conductive layers (e.g. metal layers) of circuit boards, such as printed circuit boards (PCBs), where vertical components can be conductive vias.

In FIG. 9 to FIG. 12, the portions with complete horizontal conductive layers and vertical conductive vias can operate as a conductive wall of the antenna. By removing and not placing some of the conductive vias, a slot can be formed to implement the aforementioned structure.

Figure 12:
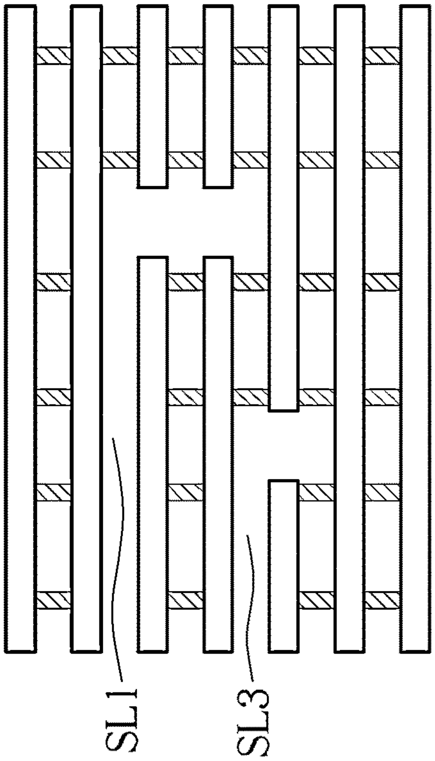

FIG. 9 can be related to FIG. 1 and FIG. 5, by not placing conductive vias, the first slot SL1 can be formed. FIG. 10 can be related to FIG. 2 and FIG. 7, by not placing conductive vias, the first slot SL1 with a bent shape can be formed. FIG. 11 can be related to FIG. 3 and FIG. 6, by not placing conductive vias, the first slot SL1 and the third slot SL3 can be formed. FIG. 12 can be related to FIG. 4 and FIG. 8, by not placing conductive vias, the first slot SL1 and the third slot SL3 with bent shapes can be formed. As shown in FIG. 9 to FIG. 12, the lengths of the slots can also be adjusted according to requirements.

Figure 13:
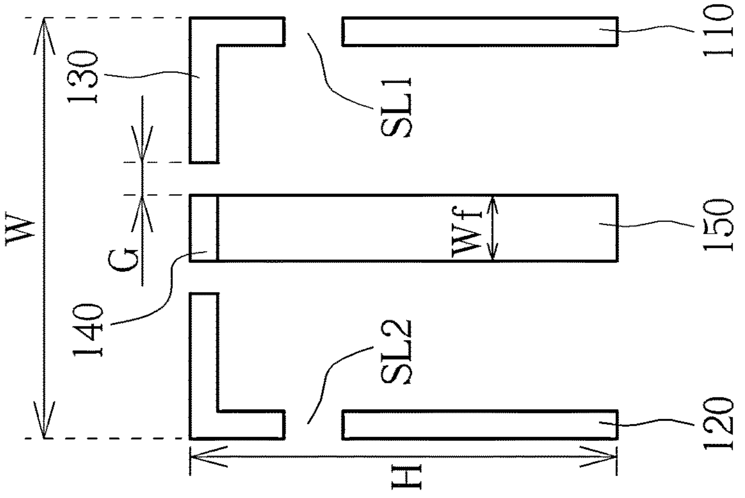
FIG. 13 shows a front view of the antenna in FIG. 1.
Figure 14:
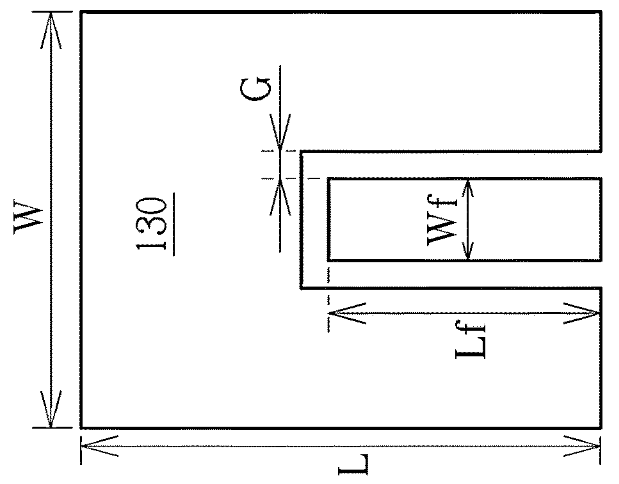
FIG. 14 shows a top view of the antenna in FIG. 1.
Figure 15:
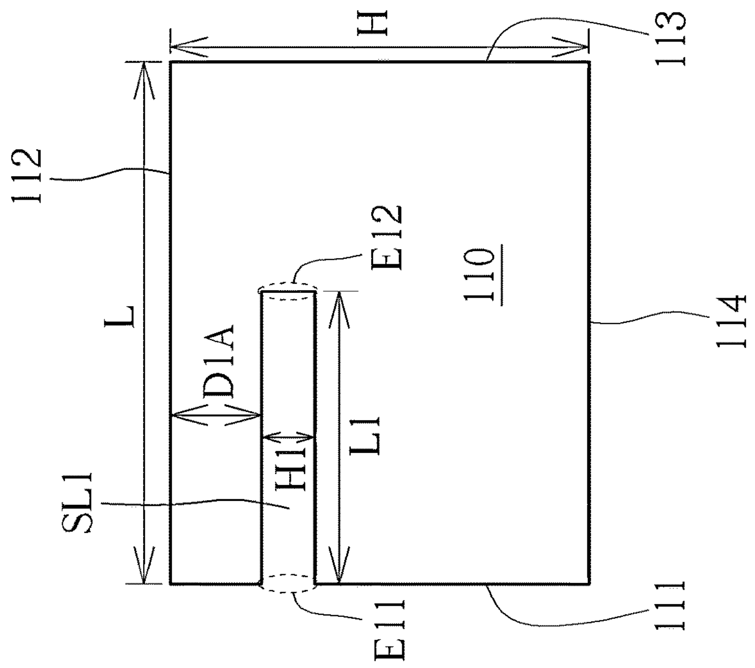
FIG. 15 shows a side view of the antenna in FIG. 1.

FIG. 13 shows a front view of the antenna 100 of FIG. 1. FIG. 14 shows a top view of the antenna 100 of FIG. 1. FIG. 15 shows a side view of the antenna 100 of FIG. 1.

Below, the first predetermined unit can be a low-frequency wavelength, i.e., the aforementioned $\lambda_{LB}$. The second predetermined unit can be a high-frequency wavelength, i.e., the aforementioned $\lambda_{HB}$. The second predetermined unit can be smaller than the first predetermined unit.

In FIG. 13 to FIG. 15, a predetermined width W between the first wall 110 and the second wall 120 can be between 0.2 and 0.3 times a first predetermined unit (e.g. $\lambda_{LB}$). A predetermined length L between the front side 111 of the first wall 110 and the rear side 113 of the first wall 110 can be between 0.4 and 0.5 times the first predetermined unit. The predetermined height H between the upper side 112 of the first wall 110 and the lower side 114 of the first wall 110 can be between 0.2 and 0.25 times the first predetermined unit.

The length L1 between the open end E11 and the closed end E12 of the first slot SL1 can be between 0.2 and 0.3 times a second predetermined unit (e.g. $\lambda_{HB}$). The first slot SL1 can have an upper side and a lower side, and the distance H1 between the upper side and the lower side of the first slot SL1 can be between 0.05 and 0.15 times the second predetermined unit. The distance D1A between the upper side of the first slot SL1 and the upper side 112 of the first wall 110 can be between 0.05 and 0.15 times the second predetermined unit.

In FIG. 13 to FIG. 15, a width Wf of the conductive path 150, a length Lf of the feed element 140, and a gap G between the feed element 140 and the wall 130 can be determined according to the required impedances. The thickness of the first wall 110, the second wall 120, and the third wall 130 can be determined based on the design rules of the process.

Figure 16:
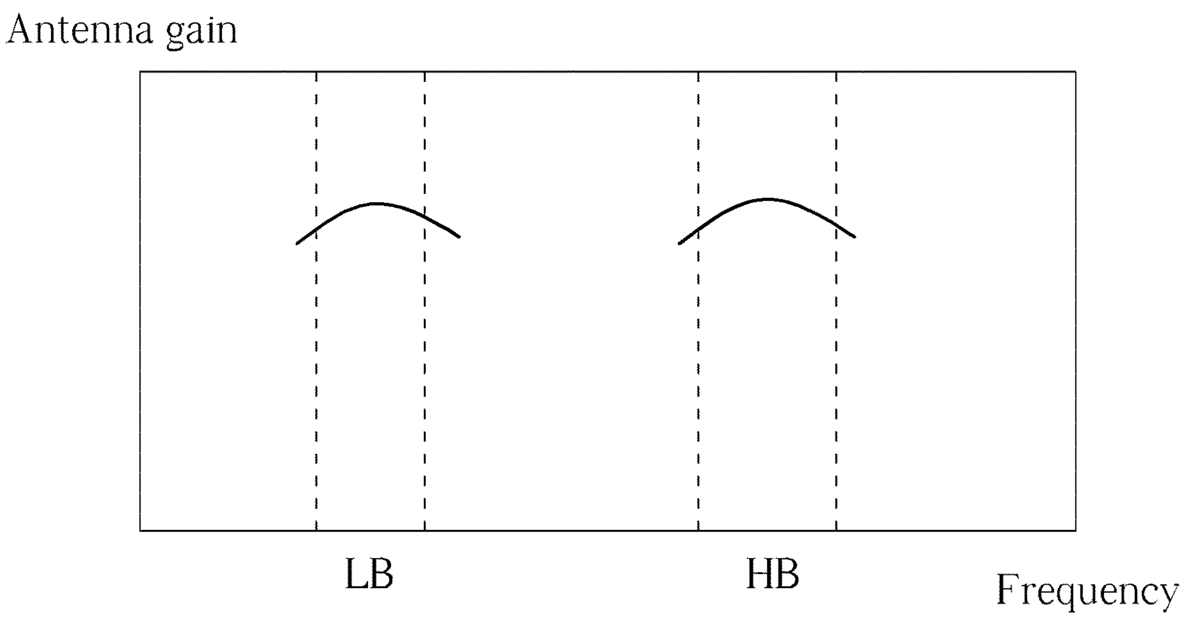
FIG. 16 shows an operational diagram of the antenna in FIG. 1.

FIG. 16 shows an operational diagram of the antenna 100 of FIG. 1. In FIG. 16, the horizontal axis represents frequency, and the vertical axis represents antenna gain. Due to the presence of the first slot SL1 and the second slot SL2, the antenna 100 can operate not only in the LB frequency band but also in the HB frequency band.

The antennas in FIG. 1 to FIG. 15 can provide a radiation direction along direction DR1 of FIG. 1, which is the endfire direction. Furthermore, when the antenna has more slots, it can operate in additional frequency bands. The shape of the slots can be adjusted to modify the radiation pattern and operating frequency bands of the antenna.

In summary, the various antennas provided by embodiments can achieve higher performance within limited dimensions. Solutions are provided for the manufacturing of antenna-in-module (AIM). The antenna performance is improved, and the radiation directions and operating frequency bands are enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna configured to access a wireless signal, comprising:

a first wall, having a front side, an upper side, a lower side, a rear side, and a first slot having an open end at the front side of the first wall, and a closed end;

a second wall, having a front side, an upper side, a lower side, a rear side, and a second slot having an open end at the front side of the second wall, and a closed end;

a third wall connected to the upper side of the first wall and the upper side of the second wall;

a feed element configured to access a first signal corresponding to the wireless signal; and a conductive path configured to transmit the first signal, and having a first terminal coupled to the feed element, and a second terminal coupled to a feed point;

wherein the third wall has a recess, and the feed element is formed in the recess and substantially coplanar with the third wall.

2. The antenna of claim 1, wherein the first wall is substantially parallel to the second wall.

3. The antenna of claim 1, wherein the first slot is substantially parallel to the second slot.

4. The antenna of claim 1, wherein:

a distance between the open end of the first slot and the lower side of the first wall is substantially equal to a distance between the open end of the second slot and the lower side of the second wall; and a distance between the closed end of the first slot and the lower side of the first wall is substantially equal to a distance between the closed end of the second slot and the lower side of the second wall.

5. The antenna of claim 1, wherein:

each of the first slot and the second slot further has an upper side and a lower side; and a distance between the upper side and the lower side of the first slot is substantially equal to a distance between the upper side and the lower side of the second slot.

6. The antenna of claim 1, wherein:

the first slot further has:

a first part, formed along a first reference line, having a first end connected to the open end of the first slot, and a second end; and a second part, formed along a second reference line different from the first reference line, having a first end connected to the second end of the first part of the first slot, and a second end connected to the closed end of the first slot; and the second slot further has:

a first part, formed along the first reference line, having a first end connected to the open end of the second slot, and a second end; and a second part, formed along the second reference line, having a first end connected to the second end of the first part of the second slot, and a second end connected to the closed end of the second slot.

7. The antenna of claim 1, wherein:

the first wall further has a third slot formed below the first slot, and having an open end at the front side of the first wall, and a closed end; and the second wall further has a fourth slot formed below the second slot, and having an open end at the front side of the second wall, and a closed end.

8. The antenna of claim 7, wherein:

a length between the open end and the closed end of the first slot is not smaller than a length between the open end and the closed end of the third slot; and a length between the open end and the closed end of the second slot is not smaller than a length between the open end and the closed end of the fourth slot.

9. The antenna of claim 7, wherein the first slot, the second slot, the third slot, and the fourth slot are substantially parallel to each other; and open ends of the first slot, the second slot, the third slot, and the fourth slot are lower than or higher than their respective closed ends.

10. The antenna of claim 7, wherein:

a distance from the open end of the third slot to the lower side of the first wall is substantially equal to a distance from the open end of the fourth slot to the lower side of the second wall; and a distance from the closed end of the third slot to the lower side of the first wall is substantially equal to a distance from the closed end of the fourth slot to the lower side of the second wall.

11. The antenna of claim 7, wherein:

the third slot further has:

a first part formed along a third reference line, and having a first end connected to the open end of the third slot, and a second end; and a second part formed along a fourth reference line different from the third reference line, and having a first end connected to the second end of the first part of the third slot, and a second end connected to the closed end of the third slot; and the fourth slot further has:

a first part formed along the third reference line, and having a first end connected to the open end of the fourth slot, and a second end; and a second part formed along the fourth reference line, and having a first end connected to the second end of the first part of the fourth slot, and a second end connected to the closed end of the fourth slot.

12. The antenna of claim 1, wherein:

a predetermined width between the first wall and the second wall is between 0.2 and 0.3 times a first predetermined unit;

a predetermined length between the front side of the first wall and the rear side of the first wall is between 0.4 and 0.5 times the first predetermined unit;

a predetermined height between the upper side of the first wall and the lower side of the first wall is between 0.2 and 0.25 times the first predetermined unit;

a length between the open end and the closed end of the first slot is between 0.2 and 0.3 times a second predetermined unit;

the first slot further has an upper side and a lower side, and a width between the upper side and the lower side of the first slot is between 0.05 and 0.15 times the second predetermined unit;

a distance between the upper side of the first slot and the upper side of the first wall is between 0.05 and 0.15 times the second predetermined unit; and the second predetermined unit is smaller than the first predetermined unit.

13. An antenna configured to access a wireless signal, comprising:

a first wall, having a front side, an upper side, a lower side, a rear side, and a first slot having an open end at the front side of the first wall, and a closed end;

a second wall, having a front side, an upper side, a lower side, a rear side, and a second slot having an open end at the front side of the second wall, and a closed end;

a third wall connected to the upper side of the first wall and the upper side of the second wall;

a feed element configured to access a first signal corresponding to the wireless signal; and a conductive path configured to transmit the first signal, and having a first terminal coupled to the feed element, and a second terminal coupled to a feed point;

wherein:

the first wall further has a third slot formed below the first slot, and having an open end at the front side of the first wall, and a closed end; and the second wall further has a fourth slot formed below the second slot, and having an open end at the front side of the second wall, and a closed end.

14. The antenna of claim 13, wherein the first wall is substantially parallel to the second wall.

15. The antenna of claim 13, wherein the first slot is substantially parallel to the second slot.

16. The antenna of claim 13, wherein:

a distance between the open end of the first slot and the lower side of the first wall is substantially equal to a distance between the open end of the second slot and the lower side of the second wall; and a distance between the closed end of the first slot and the lower side of the first wall is substantially equal to a distance between the closed end of the second slot and the lower side of the second wall.

17. The antenna of claim 13, wherein:

each of the first slot and the second slot further has an upper side and a lower side; and a distance between the upper side and the lower side of the first slot is substantially equal to a distance between the upper side and the lower side of the second slot.

18. The antenna of claim 13, wherein:

the first slot further has:

a first part, formed along a first reference line, having a first end connected to the open end of the first slot, and a second end; and a second part, formed along a second reference line different from the first reference line, having a first end connected to the second end of the first part of the first slot, and a second end connected to the closed end of the first slot; and the second slot further has:

a first part, formed along the first reference line, having a first end connected to the open end of the second slot, and a second end; and a second part, formed along the second reference line, having a first end connected to the second end of the first part of the second slot, and a second end connected to the closed end of the second slot.

19. The antenna of claim 13, wherein:

a length between the open end and the closed end of the first slot is not smaller than a length between the open end and the closed end of the third slot; and a length between the open end and the closed end of the second slot is not smaller than a length between the open end and the closed end of the fourth slot.

20. The antenna of claim 13, wherein the first slot, the second slot, the third slot, and the fourth slot are substantially parallel to each other; and open ends of the first slot, the second slot, the third slot, and the fourth slot are lower than or higher than their respective closed ends.

21. The antenna of claim 13, wherein:

a distance from the open end of the third slot to the lower side of the first wall is substantially equal to a distance from the open end of the fourth slot to the lower side of the second wall; and a distance from the closed end of the third slot to the lower side of the first wall is substantially equal to a distance from the closed end of the fourth slot to the lower side of the second wall.

22. The antenna of claim 13, wherein:

the third slot further has:

a first part formed along a third reference line, and having a first end connected to the open end of the third slot, and a second end; and a second part formed along a fourth reference line different from the third reference line, and having a first end connected to the second end of the first part of the third slot, and a second end connected to the closed end of the third slot; and the fourth slot further has:

a first part formed along the third reference line, and having a first end connected to the open end of the fourth slot, and a second end; and a second part formed along the fourth reference line, and having a first end connected to the second end of the first part of the fourth slot, and a second end connected to the closed end of the fourth slot.

23. The antenna of claim 13, wherein:

a predetermined width between the first wall and the second wall is between 0.2 and 0.3 times a first predetermined unit;

a predetermined length between the front side of the first wall and the rear side of the first wall is between 0.4 and 0.5 times the first predetermined unit;

a predetermined height between the upper side of the first wall and the lower side of the first wall is between 0.2 and 0.25 times the first predetermined unit;

a length between the open end and the closed end of the first slot is between 0.2 and 0.3 times a second predetermined unit;

the first slot further has an upper side and a lower side, and a width between the upper side and the lower side of the first slot is between 0.05 and 0.15 times the second predetermined unit;

a distance between the upper side of the first slot and the upper side of the first wall is between 0.05 and 0.15 times the second predetermined unit; and the second predetermined unit is smaller than the first predetermined unit.

* * * * *